(12) United States Patent
Farrell et al.

(10) Patent No.: US 8,091,345 B2
(45) Date of Patent: Jan. 10, 2012

(54) APPARATUS, SYSTEM, AND METHOD FOR EFFICIENTLY INCREASING EXHAUST FLOW TEMPERATURE FOR AN INTERNAL COMBUSTION ENGINE

(75) Inventors: Lisa A. Farrell, Columbus, IN (US); Timothy R. Frazier, Columbus, IN (US); Kyle Miller, Charleston, SC (US)

(73) Assignee: Cummins IP, Inc, Minneapolis, MN (US)

( * ) Notice: Subject to any disclaimer, the term of this patent is extended or adjusted under 35 U.S.C. 154(b) by 1009 days.

(21) Appl. No.: 12/027,179

(22) Filed: Feb. 6, 2008

(65) Prior Publication Data
US 2009/0198429 A1    Aug. 6, 2009

(51) Int. Cl.
*F01N 3/00* (2006.01)
*F01N 3/10* (2006.01)
*F01L 1/34* (2006.01)

(52) U.S. Cl. ............... 60/294; 60/274; 60/284; 60/299; 123/90.15

(58) Field of Classification Search ............ 60/273, 60/274, 284, 285, 294, 295, 299, 300, 311, 60/312; 123/90.15, 90.16
See application file for complete search history.

(56) References Cited

U.S. PATENT DOCUMENTS

| | | | |
|---|---|---|---|
| 5,398,502 A * | 3/1995 | Watanabe | ............ 60/284 |
| 6,304,815 B1 | 10/2001 | Moraal et al. | |
| 6,382,177 B1 | 5/2002 | Saito | |
| 6,408,834 B1 | 6/2002 | Brackney et al. | |
| 6,519,933 B2 * | 2/2003 | Ogiso et al. | ............ 60/285 |
| 6,594,990 B2 | 7/2003 | Kuenstler et al. | |
| 6,606,979 B2 | 8/2003 | Kimura | |
| 6,666,020 B2 | 12/2003 | Tonetti et al. | |
| 6,729,128 B2 * | 5/2004 | Shiratani et al. | ............ 60/297 |
| 6,738,702 B2 | 5/2004 | Kolmanovsky et al. | ........ 701/54 |
| 6,826,905 B2 | 12/2004 | Gui et al. | ............ 60/295 |
| 6,829,890 B2 | 12/2004 | Gui et al. | |
| 6,862,881 B1 | 3/2005 | Klingbeil et al. | |
| 6,925,802 B2 | 8/2005 | Arnold | |
| 6,925,976 B2 | 8/2005 | Israel et al. | |

(Continued)

FOREIGN PATENT DOCUMENTS
EP    1 270 884    6/2002
(Continued)

OTHER PUBLICATIONS

"How does Variable Turbine Geometry Work?", http://paultan.org/archives/2006/08/16/how-does-variable-turbine-geometry-work/, Mar. 27, 2008.

(Continued)

*Primary Examiner* — Thomas Denion
*Assistant Examiner* — Audrey K. Bradley
(74) *Attorney, Agent, or Firm* — Kunzler Needham Massey & Thorpe (57) ABSTRACT

An apparatus, system, and method are disclosed for efficiently increasing exhaust flow temperature for an internal combustion engine. The method includes excepting a user input to disable an exhaust valve opening mechanism. The method further includes monitoring exhaust gas mass flows and temperatures, interpreting required exhaust temperatures for aftertreatment devices, and surveying a plurality of operating conditions for a combustion engine. The method includes determining a crankshaft angle for dynamically engaging an exhaust valve open mode based on the exhaust temperature, the required exhaust temperature, and the engine operating conditions. Dynamically engaging the exhaust valve open mode includes selecting a specific crankshaft angle for each combustion cycle of the engine.

21 Claims, 8 Drawing Sheets

U.S. PATENT DOCUMENTS

| | | |
|---|---|---|
| 6,948,476 B2 | 9/2005 | Gioannini et al. |
| 6,951,100 B2 | 10/2005 | Kuboshima et al. |
| 6,952,918 B2 | 10/2005 | Imai et al. |
| 6,952,919 B2 | 10/2005 | Otake et al. |
| 6,959,541 B2 | 11/2005 | Kosaka et al. |
| 6,978,603 B2 | 12/2005 | Asanuma |
| 6,978,604 B2 | 12/2005 | Wang et al. |
| 6,988,361 B2 | 1/2006 | van Nieuwstadt et al. |
| 7,044,118 B2 | 5/2006 | Tonetti et al. |
| 7,086,220 B2 | 8/2006 | Imai et al. |
| 7,155,334 B1 | 12/2006 | Stewart et al. |
| 7,156,062 B2 | 1/2007 | Vanderpoel ............ 123/90.59 |
| 7,178,331 B2 | 2/2007 | Blakeman et al. |
| 7,246,595 B1 * | 7/2007 | Hoare et al. ............ 123/294 |
| 7,421,837 B2 | 9/2008 | Abe |
| 7,469,533 B2 | 12/2008 | Dawson et al. |
| 7,657,364 B2 | 2/2010 | Guo |
| 2004/0055282 A1 | 3/2004 | Gray et al. |
| 2004/0244366 A1 | 12/2004 | Hiranuma et al. |
| 2005/0154519 A1 | 7/2005 | Kim |
| 2005/0223699 A1 | 10/2005 | Ancimer et al. |
| 2005/0235953 A1 | 10/2005 | Weber et al. ............ 123/316 |
| 2005/0241597 A1 | 11/2005 | Weber et al. ............ 123/90.12 |
| 2006/0242950 A1 | 11/2006 | Wang et al. |
| 2007/0214772 A1 | 9/2007 | England |
| 2008/0010975 A1 | 1/2008 | Zhang et al. |
| 2008/0078169 A1 | 4/2008 | Ishibashi |
| 2009/0266060 A1 | 10/2009 | Guo et al. |
| 2009/0293453 A1 | 12/2009 | Sujan |

FOREIGN PATENT DOCUMENTS

| | | |
|---|---|---|
| EP | 1344897 A2 | 9/2003 |
| EP | 1 598 526 | 4/2005 |
| EP | 1662101 A1 | 5/2006 |
| EP | 1676991 A2 | 7/2006 |
| KR | 1020050070572 | 7/2005 |
| KR | 100589168 B1 | 6/2006 |

OTHER PUBLICATIONS

"Turbocharging", http://www.autozine.org/technical_school/engine/tech_engine_3.htm, Mar. 27, 2008.

PCT/US2009/045847, International Search Report and Written Opinion, Jan. 18, 2010.

PCT/US2009/042121, International Search Results and Written Opinion, Dec. 1, 2009.

PCT/US2009/031015 International Search Report and Written Opinion, Aug. 13, 2009.

PCT/US2009/033423 International Search Report and Written Opinion, Jul. 28, 2009.

\* cited by examiner

Temp C 502 — Engine Torque FtLb 506

| 250 | 100 | 200 | 400 | 600 | 800 |
|---|---|---|---|---|---|
| 500 | 55 | 60 | 70 | 90 | 100 |
| 1000 | 65 | 70 | 80 | 100 | 135 |
| 1500 | 60 | 65 | 75 | 95 | 135 |
| 2000 | 50 | 57 | 75 | 90 | 100 |
| 2500 | 35 | 45 | 60 | 70 | 80 |

504 — Engine Speed RPM

Crankshaft Angle Degrees 414

Fig. 5A

Temp C 502 — Engine Torque FtLb 506

| 300 | 100 | 200 | 400 | 600 | 800 |
|---|---|---|---|---|---|
| 500 | 45 | 50 | 60 | 80 | 100 |
| 1000 | 55 | 60 | 70 | 90 | 135 |
| 1500 | 50 | 55 | 65 | 85 | 135 |
| 2000 | 40 | 47 | 65 | 80 | 90 |
| 2500 | 25 | 35 | 50 | 60 | 70 |

504 — Engine Speed RPM

Crankshaft Angle Degrees 414

APPARATUS, SYSTEM, AND METHOD FOR EFFICIENTLY INCREASING EXHAUST FLOW TEMPERATURE FOR AN INTERNAL COMBUSTION ENGINE

BACKGROUND OF THE INVENTION

1. Field of the Invention

This invention relates to engine exhaust gas systems for internal combustion engines, and more particularly relates to increasing exhaust flow temperatures for aftertreatment devices.

2. Description of the Related Art

Environmental concerns motivate emissions requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type and intended use. Emission requirements for compression-ignition (diesel) engines typically dictate the release of diesel particulate matter (DPM), nitrogen oxides ($NO_X$), and unburned hydrocarbons (UHC).

The need to comply with emissions requirements encourages the development of exhaust gas aftertreatment systems. Aftertreatment systems frequently include components requiring periodic temperature increases. A diesel oxidation catalyst (DOC) aftertreatment device may require an exhaust flow temperature increase to oxidize UHC in the exhaust stream. A $NO_X$ adsorption catalyst (NAC) aftertreatment device may require an exhaust flow temperature increase to facilitate a regeneration event within the device. A N diesel particulate filter (DPF) aftertreatment device may require exhaust flow temperature increases to oxidize collected soot particles. Other aftertreatment devices such as 3-way catalysts and 4-way catalysts may simultaneously oxide and reduce exhaust gas components, and require regeneration. Temperature increases for multi-purpose aftertreatment devices may require narrow exhaust flow temperature range targets to meet competing temperature requirements.

Currently, several methods for increasing exhaust flow temperature exist. One method comprises "dosing" the exhaust flow with fuel such that a device in the aftertreatment system may burn the fuel to facilitate an increase of the exhaust flow temperature. Often, dosing is introduced "in-cylinder" to ensure that the fuel is thoroughly mixed in the exhaust flow by the time the fuel reaches the aftertreatment system. One challenge of dosing systems is a significant time lag between the beginning of dosing and the increase of temperature within the aftertreatment system. A major challenge experienced with in-cylinder dosing is that, to prevent fouling of components ion the recycle stream, and unknown quantities of fuel recycling to the intake air and disrupting the designed engine torque and air-fuel ratios, the exhaust gas recirculation (EGR) system is usually closed during periods of dosing. While dosing may facilitate temperature increases in the exhaust flow and thereby regenerate the aftertreatment components, emissions may spike during this dosing phase with the EGR shut off.

Another method for increasing exhaust flow temperature comprises manipulating the timing of introduced fuel to the combustion chamber. Typically, this is accomplished by retarding the entry of fuel. However, altering the timing of introduced fuel has limited theoretical effectiveness for increasing exhaust flow temperatures. One further method known in the art utilizes modest changes in exhaust valve timing to produce pressure pulses across an aftertreatment device. Exhaust valve timing changes in the present art are modal, responding in an on-off fashion with no control over generated pressure pulses. Further, the pressure pulses produced by this method have only limited affect on temperature generation within the aftertreatment device.

Current exhaust temperature increase methods especially lack capability at low engine exhaust flow and power output. The responses to engines that operate at low power for extended periods in the current art include lighting a lamp to indicate that user intervention is necessary, and engaging an invasive mode to purposefully regenerate the aftertreatment system—for example requiring the user to stop a vehicle and engage a specific regeneration mode.

Current methods of increasing exhaust flow temperatures to regenerate aftertreatment components have limited effectiveness, or significantly increase emissions during operation. Other challenges of current methods include slow response to an exhaust temperature change request, insufficient temperature generation in the exhaust flow, and insufficiently precise temperature ranges produced for effective and efficient operation of aftertreatment components.

SUMMARY OF THE INVENTION

From the foregoing discussion, it should be apparent that a need exists for an apparatus, system, and method for effectively and efficiently increasing an exhaust flow temperature for an internal combustion engine. Beneficially, such an apparatus, system, and method would automatically and efficiently increase the exhaust flow temperature within a given range to improve the operation and efficiency of aftertreatment components for a combustion engine.

The present invention has been developed in response to the present state of the art, and in particular, in response to the problems and needs in the art that have not yet been fully solved by currently available methods. Accordingly, described herein is an apparatus, system, and method for efficiently increasing exhaust flow temperatures that overcome many or all of the above-discussed shortcomings in the art.

A method is disclosed for efficiently increasing exhaust flow temperature for an internal combustion engine. The method may be implemented as a computer program product. The method comprises interpreting an exhaust flow temperature requirement indicator, monitoring an exhaust flow temperature, surveying a plurality of engine operating conditions, and determining a crankshaft angle target for an exhaust valve open mode. The exhaust flow temperature requirement indicator may be a temperature required to regenerate an aftertreatment component. The crankshaft angle target determination is based on the exhaust flow temperature requirement indicator, the exhaust flow temperature, and the plurality of engine operating conditions. The method further includes engaging the exhaust valve open mode based on the crankshaft angle target.

In some implementations of the method, interpreting an exhaust flow temperature requirement indicator may comprise determining a temperature requirement for an aftertreatment device. In certain instances, the aftertreatment device comprises a particulate filter and the temperature requirement comprises a temperature to oxidize soot particles with nitrogen oxides. In other instances, the aftertreatment device comprises a particulate filter and the temperature requirement comprises a temperature to oxidize soot particles with oxygen. In yet other instances, the aftertreatment device comprises a diesel oxidation catalyst and the temperature requirement comprises a temperature to oxidize unburned hydrocarbons. Additionally, in some instances, the aftertreatment device comprises a nitrogen oxide adsorption catalyst (NAC) and the temperature requirement comprises a temperature to regenerate the NAC.

Further, in some instances, the crankshaft angle target includes a value between dead-center and bottom-dead-center, inclusive. In more specific instances, the crankshaft angle target includes a value between top-dead-center and 125 degrees after top-dead-center. In yet other specific instances, crankshaft angle target includes a value between top-dead-center and 65 degrees after top-dead-center.

In yet some implementations, the engine operating conditions comprise engine speed, engine torque demand, and one of engine exhaust mass flow rate and engine inlet mass flow rate. In such implementations, the method can also include determining that the exhaust valve open mode is allowed when the one of engine exhaust mass flow rate and engine inlet mass flow rate is below a threshold. In certain implementations, the engine operating conditions further comprise an exhaust gas recycle mass flow rate. The method can also include determining that the exhaust valve open mode is allowed when the exhaust gas recycle mass flow rate is below a threshold.

The method may further comprise interpreting an exhaust valve open mode allowed indicator, and disabling the exhaust valve open mode when the exhaust valve open mode allowed indicator indicates that the exhaust valve open mode is not allowed.

The method may further include utilizing a transfer function relating a nominal crankshaft angle target to an exhaust flow final temperature based on a given engine speed and a given engine torque. The transfer function may further relate the nominal crankshaft angle target to an ambient temperature.

In one implementation, the method includes determining an error term based on temperature difference between the exhaust flow temperature and a temperature based on the exhaust flow temperature requirement indicator, and adjusting the nominal crankshaft angle target to minimize the error term. In one implementation, a proportional-integral feedback controller adjusts the crankshaft angle target to minimize the error term.

According to another embodiment, an apparatus is disclosed for efficiently increasing exhaust flow temperature for an internal combustion engine. The apparatus includes a temperature determination module configured to interpret an exhaust flow temperature requirement indicator. The apparatus includes an operating conditions module configured to survey a plurality of engine operating conditions. The apparatus further includes an opening target module configured to determine a crankshaft angle target for an exhaust valve open mode based on the exhaust flow temperature requirement indicator and the plurality of engine operating conditions. The apparatus may further include an actuation module configured to dynamically engage the exhaust valve open mode. Dynamically engaging the exhaust valve open mode may include selecting a specific crankshaft angle to engage the exhaust valve open mode for each combustion cycle of the engine.

The temperature determination module of the apparatus can be further configured to determine a target temperature based on the exhaust flow temperature requirement indicator.

The operating conditions module can be further configured to monitor an exhaust flow temperature, and wherein the opening target module is further configured to determine the crankshaft angle target based on the exhaust flow temperature. Also, in some implementations, the operating conditions module can be further configured to monitor an ambient temperature. In such implementations, the transfer function further relates the nominal crankshaft angle target to the ambient air temperature.

The opening target module can be further configured to (i) interpret a transfer function relating a nominal crankshaft angle target to an exhaust flow final temperature based on a given engine speed and a given engine torque and (ii) determine the crankshaft angle target based on the nominal crankshaft angle target. Additionally, the opening target module can be configured to (i) determine a crankshaft angle target by determining an error term based on a difference of the exhaust flow temperature and the target temperature and (ii) adjust the nominal crankshaft angle target to minimize the error term.

In some implementations, the apparatus includes a diesel oxidation catalyst (DOC). The exhaust flow temperature requirement indicator may then comprise a temperature required at an engine exhaust outlet such that a temperature at the DOC is sufficient to oxidize unburned hydrocarbons in the exhaust.

In some implementations, the apparatus includes a particulate filter. The exhaust flow temperature requirement indicator can comprise an indication that the particulate filter requires a regeneration event.

In yet some implementations, the apparatus includes a particulate filter. The exhaust flow temperature requirement indicator can comprise a temperature required at an engine exhaust outlet such that a temperature at the particulate filter is sufficient to oxidize particulates on the particulate filter.

The apparatus can also include a $NO_x$-adsorption catalyst (NAC). In certain instances, the exhaust flow temperature requirement indicator can then comprises an indication that the NAC requires a regeneration event. In some instances, the exhaust flow temperature requirement indicator comprises a temperature required at an engine exhaust outlet such that the NAC desorbs $NO_x$ and regenerates.

A system is disclosed for efficiently increasing exhaust flow temperature for an internal combustion engine. The system includes an internal combustion engine having a crankshaft and an exhaust valve, and producing an exhaust flow. The system further includes an exhaust valve opening mechanism configured to force the exhaust valve open at variably commanded crank angles. The system further includes an aftertreatment component, requiring periodic exhaust flow temperature increases, and a controller. The controller includes a plurality of modules configured to functionally execute efficiently increasing exhaust flow temperature for the internal combustion engine. The controller includes a temperature determination module, an operating conditions module, an opening target module, and an actuation module.

In some implementations, the aftertreatment component of the system can be a diesel oxidation catalyst, a nitrogen-oxide adsorption catalyst, particulate filter, three-way catalyst, and/or four-way catalyst.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the various embodiments briefly described above will be rendered by reference to specific embodiments that are illustrated in the appended drawings. Understanding that these drawings depict only typical embodiments of the invention and are not therefore to be considered to be limiting of its scope, a description and explanation of various embodiments of the invention with additional specificity and detail will be aided through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
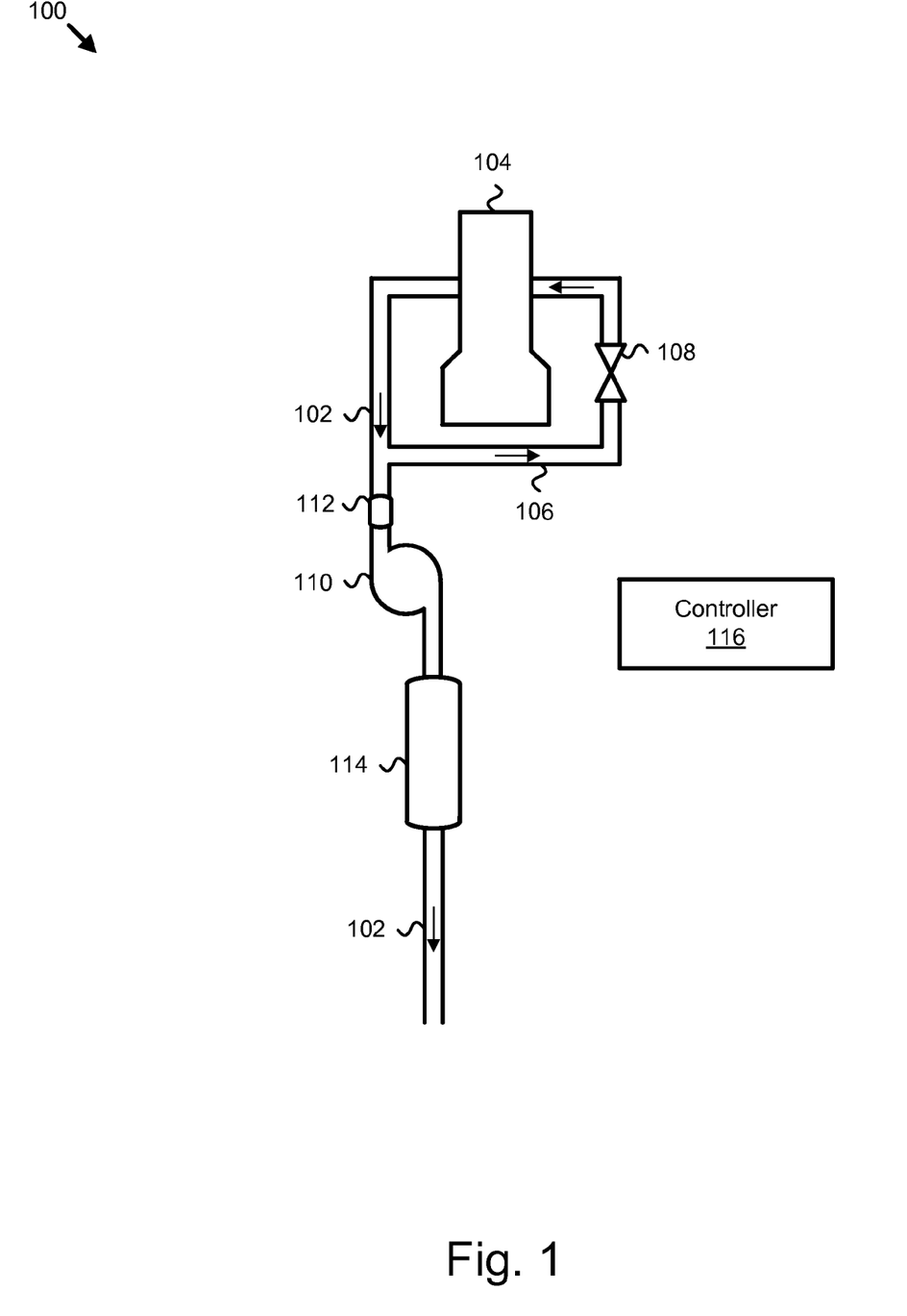
FIG. 1 is an illustration depicting one embodiment of a system to efficiently increase exhaust flow temperature for an internal combustion engine.

FIG. 1 is an illustration depicting one embodiment of a system 100 to efficiently increase exhaust flow 102 temperature for an internal combustion engine 104. The engine 104 may be any type of internal combustion engine 104 comprising a crankshaft (not shown) and at least one exhaust valve, and producing an exhaust flow 102. In one embodiment, the combustion engine 104 may be a diesel engine 104. A portion of the exhaust stream may be diverted to an exhaust gas recirculation (EGR) stream 106, through an EGR cooler 108. The EGR stream 106 may be controlled by an EGR valve (not shown) and mixed with intake air (not shown). The system 100 may further comprise a turbocharger 110. The turbocharger 110 may be any turbocharger configuration known in the art, including without limitation standard, wastegate, and variable geometry (VGT) turbochargers 110. The turbocharger 110 may comprise more than one turbocharger 110 configured in parallel or in series. The turbocharger 110 may further comprise a turbo inlet 112 configured to receive the exhaust flow 102 from the engine 104.

The system 100 further comprises an aftertreatment component 114 requiring periodic exhaust flow 102 temperature increases. In one embodiment, the aftertreatment device 114 may be a particulate filter (PF) 114, and the temperature requirement may comprise a temperature to oxidize soot particles with nitrogen oxides. The temperature requirement for the PF 114 may alternatively comprise a temperature to oxidize soot particles with oxygen. Furthermore, the aftertreatment component 114 may be any combination of aftertreatment components 114 including a diesel oxidation catalyst (DOC) 114 configured to oxidize unburned hydrocarbons, a nitrogen-oxide adsorption catalyst (NAC) 114 configured to regenerate, a three-way catalyst 114, and/or a four-way catalyst 114. The three-way catalyst 114 eliminates toxicity from the exhaust gas flow, functioning most effectively in a narrow temperature range to simultaneously reduce $NO_x$ to $N_2$ and $O_2$, oxidize CO to $CO_2$, and oxidize unburned hydrocarbons to $CO_2$ and $H_2O$. The four-way catalyst 114 functions similarly to the 3-way catalyst 114 with the additional capacity to remove particulate matter (PM), such as soot, from the exhaust gas flow 102.

The system 100 includes a controller 116 that may be configured to interpret an exhaust flow 102 temperature and an exhaust flow temperature requirement indicator. Interpreting exhaust flow temperatures may comprise retrieving, and/or receiving temperature information from sensors, datalinks, and/or other means. In one embodiment, interpreting exhaust flow temperatures includes calculating temperature information from other system parameters such as engine speed, engine torque, and/or other engine parameters. The controller 116 comprises one or more physical components and may be configured to communicate with various sensors and actuators around the system 100. The controller 116 may be further configured to determine an exhaust flow requirement, and generate a crankshaft angle for engaging an exhaust valve open mode. In one embodiment, the exhaust flow 102 temperature may be measured at the turbo inlet 112.

The controller 116 may be configured to survey a plurality of engine operating conditions, such as engine speed, engine torque demand, engine inlet mass flow rate, engine exhaust mass flow rate, exhaust gas recirculation flow rate, and ambient temperature. In one embodiment, the controller 116 comprises a plurality of modules configured to functionally execute a method for efficiently increasing the exhaust flow temperature. The modules may include a temperature determination module, an operating conditions module, an opening target module, and an actuation module.

Figure 2:
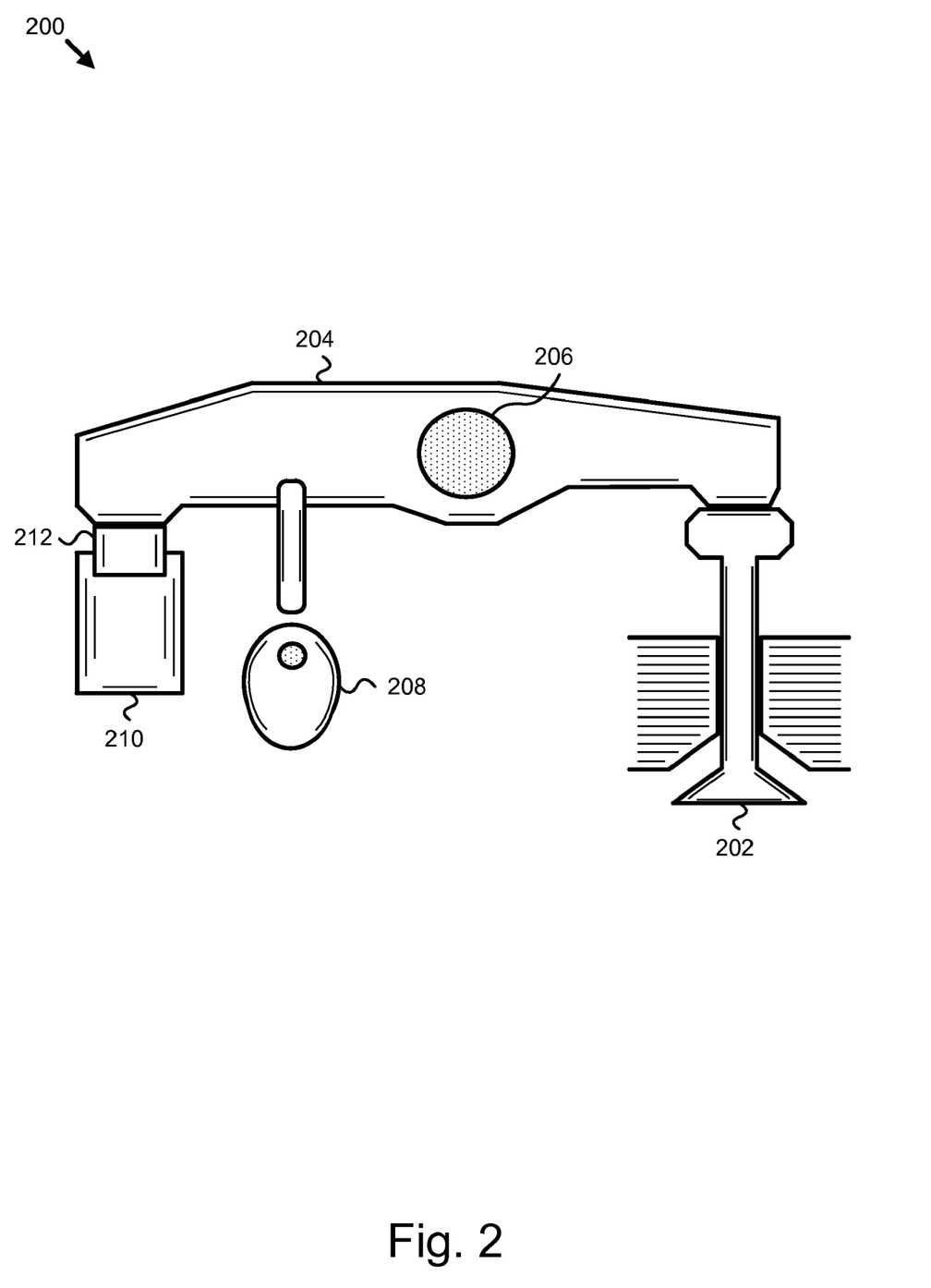
FIG. 2 is an illustration depicting one embodiment of an exhaust valve opening mechanism.

FIG. 2 is an illustration depicting one embodiment of an exhaust valve opening mechanism 200. The exhaust valve opening mechanism 200 may comprise an exhaust valve 202, a rocker arm 204, a pivot hole 206 configured to pivot around a tube, rod, or shaft (not shown), a camshaft lobe 208, and a rocker arm pivot adjuster 210. The rocker arm pivot adjuster 210 may move a piston head 212 upwards or downwards, or float the piston head 212 using hydraulic means. In alternate embodiments of the rocker arm pivot adjuster 210, the piston head 212 may be actuated using pneumatic, electrical, mechanical, and/or other means know in the art. The rocker arm pivot adjuster 210 communicates with the controller 116. The controller 116 may send an exhaust valve open mode signal to the rocker arm pivot adjuster 210, wherein the piston head 212 moves upward. Movement of the piston head 212 upward may restrict the pivot range accorded by the camshaft lobe 208 to the rocker arm 204. By restricting the pivot range of the rocker arm 204 the exhaust valve 202 may be opened (or prevented from closing) during a closing phase of the camshaft lobe 208.

In one example of the exhaust valve opening mechanism 200, an exhaust valve open mode signal is sent from the controller 116 to the rocker arm pivot adjuster 208. The rocker arm pivot adjuster 210 hydraulically moves the piston head 212 upward one millimeter, shortening the counter-clockwise pivot range of the rocker arm 204 by one millimeter. The exhaust valve 202 coupled to the rocker arm 204 moves in conjunction with the camshaft lobe 208 until the rocker arm 204 contacts the surface of the piston head 212. The piston head 212 extended upward by one millimeter may cause the exhaust valve 202 to be open by one millimeter during the camshaft lobe's 212 exhaust valve 202 closing cycle, as shown if FIG. 2.

The exhaust valve opening mechanism 200 shown in FIG. 2 depicts the camshaft lobe 208 separated from the rocker arm 204. The separation is shown to clearly illustrate the effect of the upward position of the piston head 212 in opening the exhaust valve 202 during the camshaft lobe's 212 exhaust valve closing cycle. However, most embodiments comprising the rocker arm pivot adjuster 210 may mechanically maintain a continuous connection between the camshaft lobe 208 and the rocker arm 204 to reduce lash forces between the rocker arm 204 and the camshaft lobe 208 during operation. The camshaft lobe 208 to rocker arm 204 connection may be maintained by means of a spring, lost-motion device, and/or other lash absorbing device.

The exhaust valve opening mechanism 200 is shown for illustration purposes only. Other variable valve opening mechanisms known in the art and that may be developed can be implemented into the present invention as a mechanical step for one of skill in the art. The minimum functionality required by any contemplated exhaust valve opening mechanism 200 is that it be configured to open the exhaust valve 202 at a designated crankshaft angle. The amount of opening that the exhaust valve opening mechanism 200 must be able to perform is quite small—for example about one millimeter is sufficient in a typical embodiment of the system 100—but of course a mechanism 200 capable of opening the exhaust valve 202 completely would work as well.

Figure 3A:
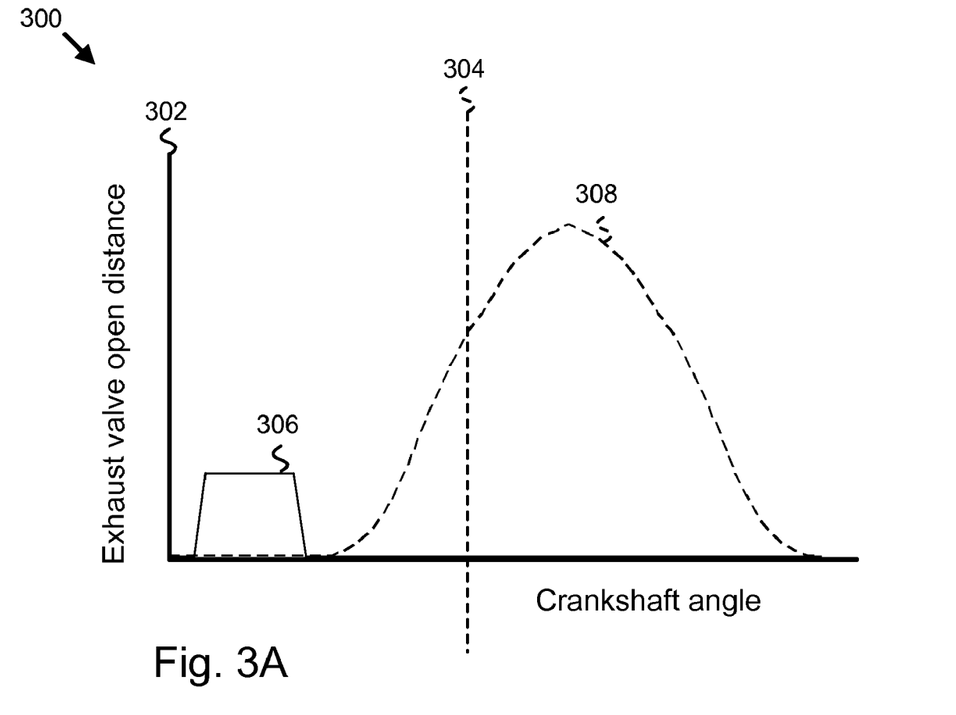
FIG. 3A is a graph depicting one embodiment of an exhaust valve open mode.
Figure 3B:
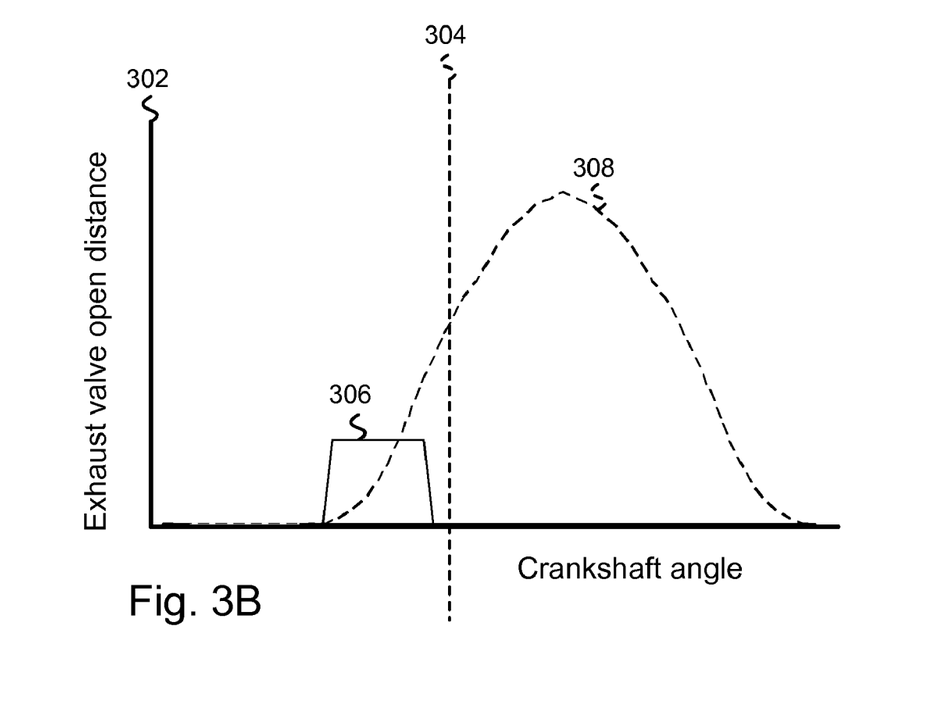
FIG. 3B is a graph depicting one embodiment of an exhaust valve open mode.

FIGS. 3A and 3B are graphs depicting specific embodiments of exhaust valve open modes 300 in accordance with the present invention. For each embodiment of the exhaust valve open mode 300 the graph shows the exhaust valve open distance (y-axis) for a specific crankshaft angle (x-axis). The graphs delineate the maximum useful range of crankshaft angles for early exhaust valve opening: from top-dead-center (TDC) 302 to bottom-dead-center (BDC) 304.

The crankshaft angles utilized to generate temperature in a given application depend upon the requirements of aftertreatment components in a given system, the areas of the engine torque-speed map wherein temperature generation is required and/or desirable, and the nominal exhaust valve opening and closing times for the system 100. In one embodiment, the exhaust valves open nominally around 130 degrees after TDC 302, and any exhaust valve opening before about 125 degrees after TDC 302 will provide temperature generation assistance. In one embodiment, the combustion characteristics of the engine 104 are such that any exhaust valve opening before about 65 degrees after TDC will provide significant temperature generation assistance. The specific crankshaft angles for a given embodiment can be determined as a mechanical step by one of skill in the art based on the specific requirements of the system 100 and the principles disclosed herein.

The graphs of FIGS. 3A and 3B further show the exhaust valve open distances for a range of crankshaft angles. The rocker arm pivot adjuster curve 306 shows the exhaust valve position enforced by the rocker arm pivot adjuster 210, and the camshaft lobe curve 308 shows the exhaust valve position enforced by the camshaft lobe 204. The operation of the rocker arm pivot adjuster 210, in one embodiment, is such that the greater opening of the exhaust valve enforced by the rocker arm pivot adjuster 210 and the camshaft lobe 204 determines the position of the exhaust valve.

For example, in FIG. 3A, the rocker arm pivot adjuster 210 opens the exhaust valve from about 20 degrees after TDC to about 90 degrees after TDC, and the cam shaft lobe 204 re-opens the exhaust valve at about 115 degrees after TDC in a normal exhaust valve opening. The illustration of FIG. 3A is consistent with a commanded exhaust valve open mode during the crankshaft angles from 20 to 90 degrees after TDC, with a normal exhaust valve opening event at about 115 degrees after TDC.

In another example, in FIG. 3B, the rocker arm pivot adjuster 210 opens the exhaust valve from about 110 degrees after TDC to about 165 degrees after TDC, and the cam shaft lobe 204 opens the exhaust valve at about 115 degrees after TDC in a normal exhaust valve opening. In the example of FIG. 3B, the rocker arm pivot adjuster 210 relinquishes the exhaust valve position control to the cam shaft lobe 204 at about 140 degrees after TDC as the rise enforced by the cam shaft lobe 204 exceeds the rise imposed by the rocker arm pivot adjuster 210. The illustration of FIG. 3B is consistent with a commanded exhaust valve open mode during the crankshaft angles from 110 to 165 degrees after TDC, with a normal exhaust valve opening event at about 115 degrees after TDC.

Figure 4:
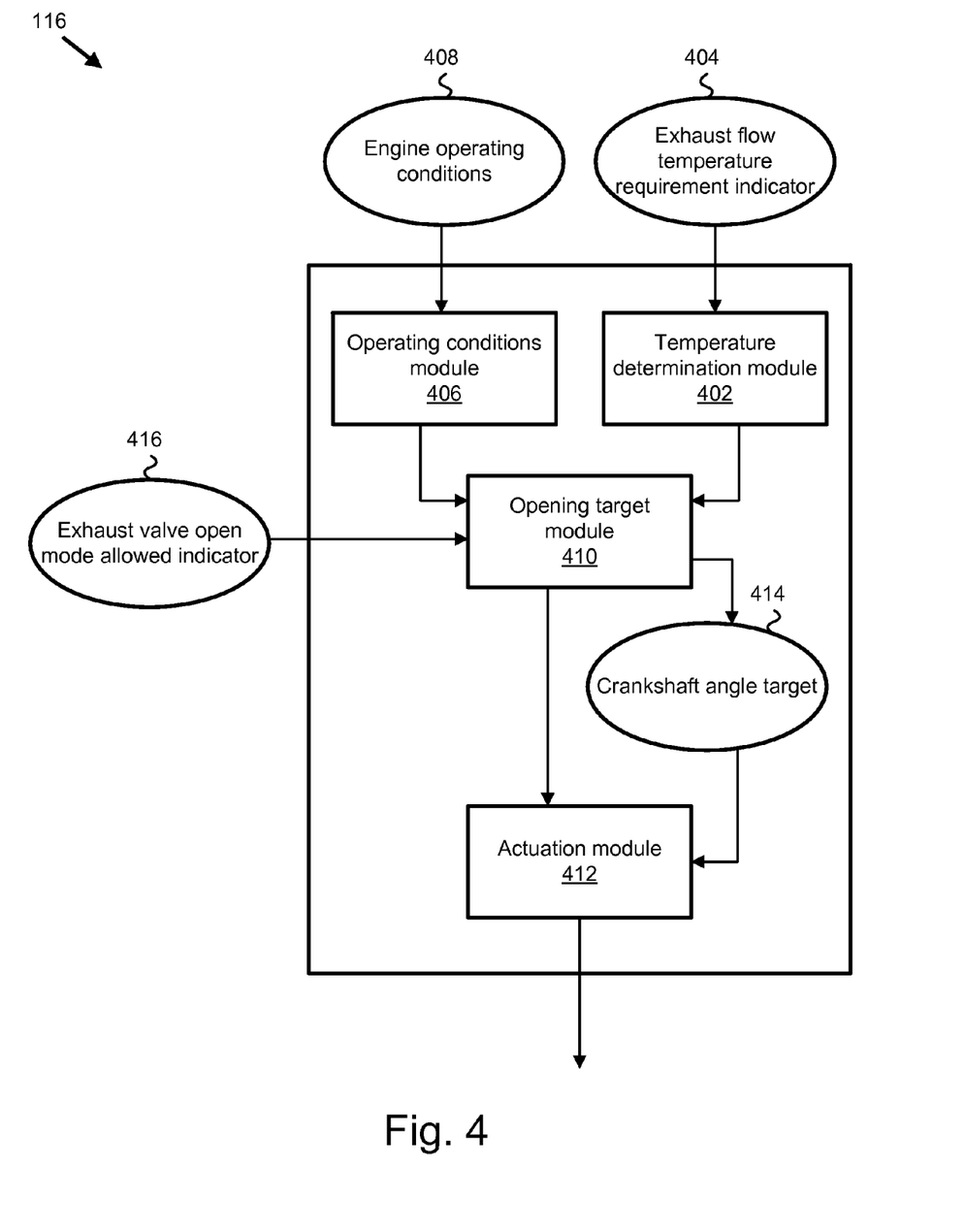
FIG. 4 is a schematic block diagram illustrating one embodiment of a controller to efficiently increase exhaust flow temperature for an internal combustion engine.

FIG. 4 is a schematic block diagram illustrating one embodiment of a controller 116 to efficiently increase exhaust flow 102 temperature for an internal combustion engine 104 in accordance with the present invention. The controller 116 comprises the temperature determination module 402 configured to interpret an exhaust flow temperature requirement indicator 404 and determine a target temperature. Interpreting an exhaust flow temperature requirement indicator 404 comprises receiving, retrieving, and/or determining a temperature requirement for an aftertreatment device 114. In one embodiment, the exhaust flow temperature requirement indicator 404 may be a regeneration request 404 of a certain type A for an aftertreatment device 114, and the controller 116 may look up a temperature required to satisfy the type A regeneration request 404 from information stored in the controller 116. In one embodiment, the exhaust flow temperature requirement indicator 404 for an aftertreatment device 114 comprises a temperature required by the aftertreatment device 114 to regenerate the device 114.

In one example, the exhaust flow temperature requirement indicator 404 may comprise an indication that a NAC needs a regeneration event requiring 300 degrees C. at the exhaust outlet 112. In another example, the exhaust flow temperature requirement indicator 404 may comprise an indication that DOC needs a regeneration event requiring 275 degrees C. to oxidize unburned hydrocarbons. In another example, the exhaust flow temperature indicator 404 may comprises an indication that a PF needs a regeneration event requiring 275 degrees C. to oxidize soot particles on the PF with oxygen. In one example, the exhaust flow temperature requirement indicator 404 may comprise an indication that a NAC needs a regeneration event, and the temperature determination module 402 may check with stored data to determine a temperature requirement to regenerate the NAC. The exhaust flow temperature requirement indicator 404 may be passed to the temperature determination module 402 from within the controller 116, from a sensor on an aftertreatment device 114, from a datalink, from a timing device configured to intermittently request temperature increases in the exhaust stream 102, and/or any other method or device known in the art.

The controller 116 further comprises the operating conditions module 206 configured to survey a plurality of engine operating conditions 208. Engine operating conditions 208 may comprise any of engine speed, engine torque demand, engine inlet mass flow rate, engine exhaust mass flow rate, exhaust gas recycle mass flow rate, exhaust flow temperature, ambient temperature, and any other parameter that may be useful in determining the current engine exhaust temperature, the current emissions levels and requirements, and the required engine exhaust temperature. The exact parameter list for a given embodiment depends on the specific system 100 and the specific system features, and are understood by one of skill in the art based on the disclosures herein. A given parameter list may be populated using sensors, datalink inputs, virtual sensors (model-based input), and/or other methods or devices.

The controller 116 includes the opening target module 410 that may be configured to monitor the exhaust flow 102 temperature signal from the operating conditions module 406 and determine the crankshaft angle target 414 for an exhaust valve open mode. The opening target module 410 may determine the crankshaft angle target 414 based on the exhaust flow 102 temperature, the exhaust flow temperature requirement indicator 404, and the plurality of other engine operating conditions 408.

In one embodiment, the opening target module 410 determines the crankshaft angle target 414 by interpreting a transfer function that relates a nominal crankshaft angle target to an exhaust flow final temperature based on a given engine speed and a given engine torque. The opening target module 410 may determine the crankshaft angle target 414 based on the nominal crankshaft angle target. For example, the nominal crankshaft angle target may be 60 degrees after TDC, and another engine limitation, for example an emissions limitation for unburned hydrocarbons in the exhaust, may be limiting the crankshaft angle target 414 to 70 degrees after TDC. In the example, the opening target module 410 determines the crankshaft angle target 414 based on the nominal crankshaft angle target by setting the crankshaft angle target 414 to a value as close to the nominal crankshaft angle as allowed.

In one embodiment, the transfer function may further relate a nominal crankshaft angle target to the ambient air temperature. In one example, the transfer function may explicitly account for ambient air temperature as an input to the function. For example, the transfer function may be implemented as a series of lookup tables, inputting engine speed and engine torque and outputting a nominal crankshaft angle. In a further example, the lookup tables may further accept ambient air temperature as an input.

In another embodiment, the opening target module 410 may correct for changes from a nominal ambient air temperature, at which the transfer function was developed, to a current ambient air temperature. For example, as ambient air temperatures fall, exhaust outlet temperatures typically fall proportionately. In many cases, adjusting the U exhaust temperature can be expected to go up or down about 0.8 degrees C. for each degree C. change in ambient temperature from the nominal ambient temperature. The proportional change for a given system 100 is a matter of simple data taking for a particular system 100 in cases where 0.8 may not yield enough accuracy.

It is a mechanical step for one of skill in the art to correct the output of the transfer function once the ambient to nominal temperature relationship is known. For example, if the ambient temperature is 15 degrees C. and the nominal temperature at which the transfer function was developed is 25 degrees C., then the correction can be applied to either the transfer function output or to the desired temperature target input. If the exhaust flow temperature requirement is 250 degrees C., the temperature determination module 402 can input a target of 258 degrees C. (i.e., 250+0.8*(25−15)) to the transfer function and get back the crankshaft angle target 414 that gives 258 degrees C. at the nominal conditions, and 250 degrees C. at the current conditions.

In an alternate example, the transfer function may be implemented as a series of tables. For example, one table may give the nominal crankshaft angles required to achieve 250 degrees C. (refer to FIG. 5A) at the nominal temperature of 25 degrees C., and a second table may give the nominal crankshaft angles required to achieve 300 degrees C. (refer to FIG. 5B) at the nominal temperature of 25 degrees C. The temperature determination module 402 may correct the first table to treat it as the nominal crankshaft angles required to achieve 242 degrees C., and treat the second table as the nominal crankshaft angles required to achieve 292 degrees C. In the example, the temperature determination module 402 may then apply linear interpolation or some other algorithm known in the art to determine the crankshaft angle target 414 required to achieve 250 degrees C. based on the corrected table output temperatures. Other methods of correcting for ambient temperature are known in the art, and the specific implementations depend upon the form of the transfer functions and the desired calculation steps for a given embodiment of the system 100.

The opening target module 410 may be further configured to determine a crankshaft angle target 414 by generating an error term based on a difference between the exhaust flow 102 temperature and the target exhaust flow temperature. The opening target module 410 may adjust the nominal crankshaft angle target 414 to minimize the error term.

Furthermore, the opening target module 410 may operate a feedforward/feedback controller to minimize the error term. For example, the opening target module 410 may utilize a transfer function to generate a nominal crankshaft angle target 414, and use the nominal crankshaft angle target 414 as a feedforward response term. The opening target module 410 may further operate a feedback controller, for example a proportional-integral (PI) controller to advance or retard the crankshaft angle target 414 based on the error term.

The controller 116 further includes the actuation module 412 configured to dynamically engage the exhaust valve open mode based on the crankshaft angle target 414. In one embodiment, dynamically engaging the exhaust valve open mode based on the crankshaft angle target 414 comprises selecting a specific crankshaft angle to engage the exhaust valve open mode for each combustion cycle of an engine.

The actuation module 412 may further determine that the exhaust valve open mode is allowed when one of the engine exhaust mass flow rate and the engine inlet mass flow rate is below a certain threshold. In most cases, excepting in rapid transitions in engine speed and torque, the inlet and exhaust mass flow rates are usually about the same. The actuation module 412 may be further configured to determine that the exhaust valve open mode is allowed when an EGR mass flow rate is below a certain threshold. The use of engine flow and EGR to limit the operation the exhaust valve open mode allows an embodiment of the system 100 to utilize the mode only in lower regions of the speed-torque curve where such behavior may be required to make the system capable of meeting temperature and/or emissions requirements.

In one embodiment, the actuation module 412 may be configured to interpret an exhaust valve open mode allowed indicator 416 to determine whether to disable the exhaust valve open mode when the exhaust valve open mode allowed indicator 416 indicates that the exhaust valve open mode is not allowed. The exhaust valve open mode allowed indicator 416 may be a control flag from another algorithm—for example an emissions mode algorithm that blocks the use of the exhaust valve open mode for a period of time. In one embodiment, the exhaust valve open mode allowed indicator 416 is an operator input allowing the operator of a motor vehicle to block the use of the exhaust valve open mode while a switch is in a set position. Other uses of the exhaust valve open mode allowed indicator 416 will be clear to one of skill in the art based on the disclosures herein and are contemplated within the scope of the present invention.

Figure 5A:
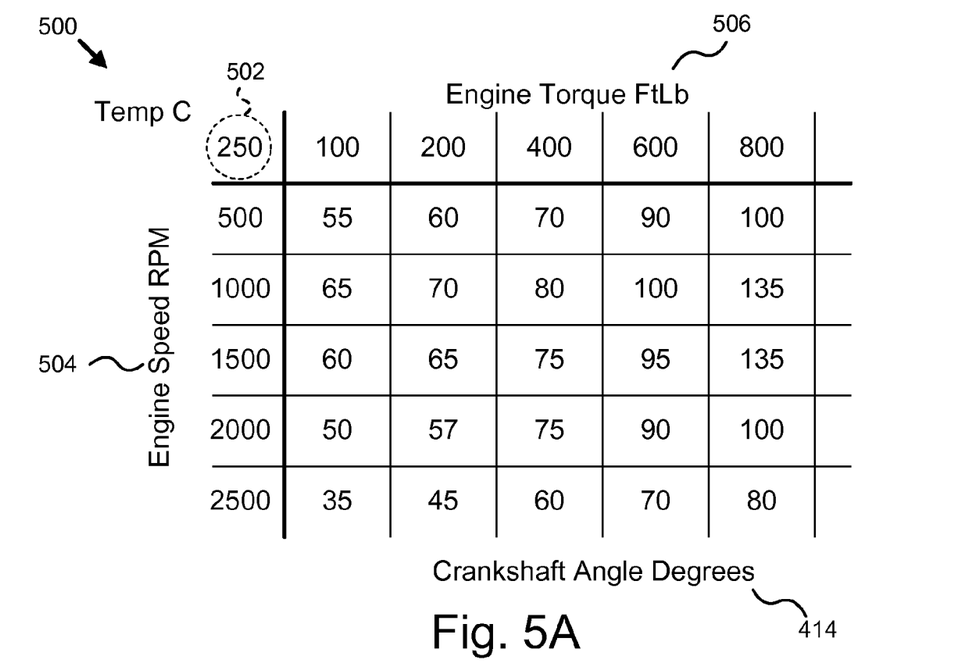
FIG. 5A is an illustration of one embodiment of a transfer function implemented as a lookup table.

FIG. 5A is an illustration of one embodiment of a transfer function 500 implemented as a lookup table. The transfer function 500 accepts engine speed 504 and engine torque 506 as inputs, and provides a crankshaft angle target 414 as an output. In the embodiment of FIG. 5A, the table 500 provides the crankshaft angle target 414 to achieve an exhaust temperature 502 of 250 degrees C. For example, a system 100 may be operating at 400 ft-lbs of torque, and 2000 rpm when a temperature of 250 degrees C. at the exhaust outlet 112 is requested by an aftertreatment device 114. In the embodiment of FIG. 5A, the table 500 indicates that a nominal crankshaft angle 414 of 75 degrees after TDC will achieve 250 degrees C. at the engine 102 exhaust.

Figure 5B:
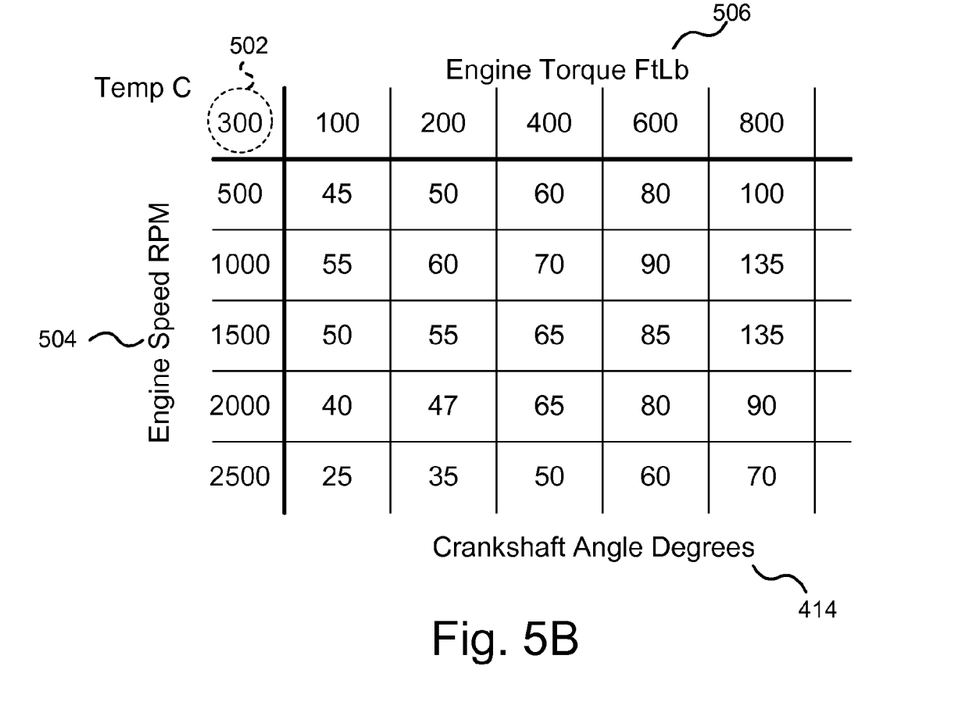
FIG. 5B is an illustration of one embodiment of a transfer function implemented as a lookup table.

FIG. 5B is an illustration of one embodiment of a transfer function 500 implemented as a lookup table in accordance with the present invention. The transfer function 500 accepts engine speed 504 and engine torque 506 as inputs, and provides a crankshaft angle target 414 as an output. In the embodiment of FIG. 5b, the table 500 provides the crankshaft angle target 414 to achieve an exhaust temperature 502 of 300 degrees C. For example, a system 100 may be operating at 400 ft-lbs of torque, and 2000 rpm when a temperature of 300 degrees C. at the exhaust outlet 112 is requested by an aftertreatment device 114. In the embodiment of FIG. 5A, the table 500 indicates that a nominal crankshaft angle 414 of 65 degrees after TDC will achieve 300 degrees C. at the engine 102 exhaust.

In one embodiment, the transfer function 500 is implemented as a plurality of lookup tables. For example, a transfer function 500 may include a first table as shown in FIG. 5A, and a second table as shown in FIG. 5B. A system 100 may be operating at 400 ft-lbs of torque, and 2000 rpm when a temperature of 280 degrees C. at the exhaust outlet 112 is requested by an aftertreatment device 114. In one embodiment, a linear interpolation between the result from FIG. 5A (75 degrees after TDC to get 250 C) and FIG. 5B (65 degrees after TDC to get 300 C) yields a nominal crankshaft angle target 414 of 69 degrees after TDC. As discussed previously in the section referencing FIG. 4, the tables of FIGS. 5A and 5B may be completed at a particular ambient air temperature, and there may be multiple instances of the tables at a variety of ambient air temperatures. For example, the tables of FIGS. 5A and 5B may have been created at 25 degrees C., and a current ambient air temperature may be 15 degrees C. In one example, the result from FIG. 5A (now: 75 degrees after TDC to get 242 C) and FIG. 5B (now: 65 degrees after TDC to get 292 deg C.) now yield an answer of 67.4 degrees after TDC (65+(12/50)*10=67.4) to get an exhaust outlet 112 temperature of 280 degrees C., using linear interpolation.

It is a mechanical step for one of skill in the art to develop tables 500 or other manifestations of a transfer function to output a crankshaft angle target 414 based on engine operating conditions 408 based on the disclosures herein.

Figure 6:
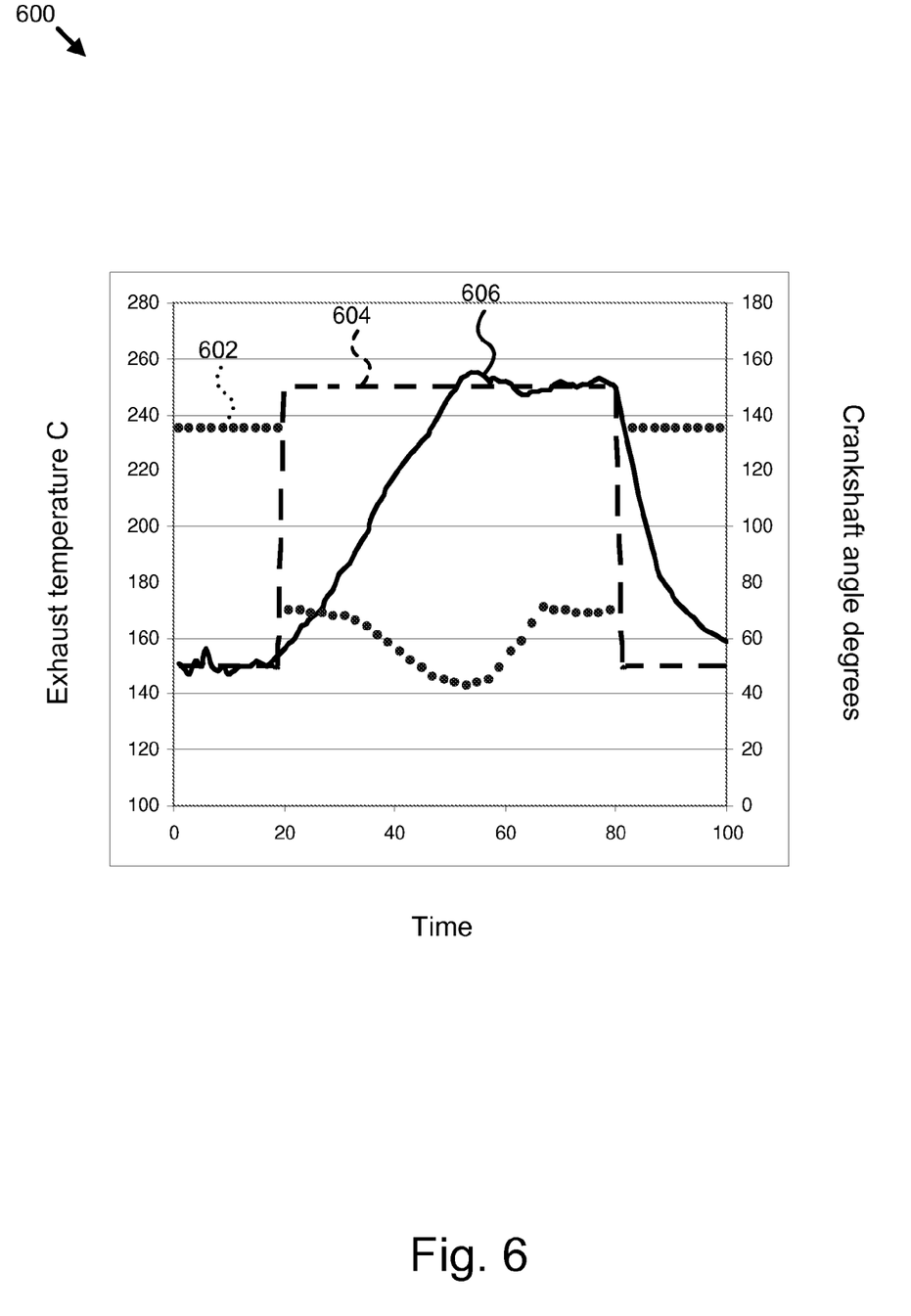
FIG. 6 is a graph illustrating one example of a feedforward/feedback control system response for an exhaust valve open mode.

FIG. 6 is a graph illustrating one example of a feed-forward/feed-back control system response 600 for an exhaust valve open mode. In one embodiment, FIG. 6 is consistent with a system using the transfer functions shown in FIGS. 5A and 5B. The graph depicts the crankshaft angle 602 at which the exhaust valve open mode is engaged, the exhaust flow temperature requirement 604, and an example of the resulting exhaust flow temperature 606. At time 20 an exhaust flow temperature requirement 604 request is made to increase the exhaust flow temperature 606 to 250 degrees C. from 150 degrees C. The opening target module 410 generates a nominal crankshaft angle target 414 from the transfer function based on the current engine operation conditions 408, and the crankshaft angle 602 switches from 135 degrees before TDC to 70 degrees before TDC based on the nominal crankshaft angle target 414. The nominal crankshaft angle target 414 of 70 degrees before TDC may comprise the feedforward response term.

A feedback response term may grow as the temperature 606 remains below the temperature target 604 (e.g. at time 40), and the exhaust valve open mode may be engaged at steadily earlier crankshaft angles until the temperature 606 exceeds the temperature target 604 (e.g. at time 50). The feedback controller continues to manipulate the crankshaft angle target 414 to maintain the design exhaust temperature 604 until the temperature request falls back to 150 degrees C., at which time the exhaust valve resumes opening at 135 degrees after TDC (e.g. at time 80). The example of FIG. 6 is only one implementation illustrating the feedforward and feedback implementations in a single embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
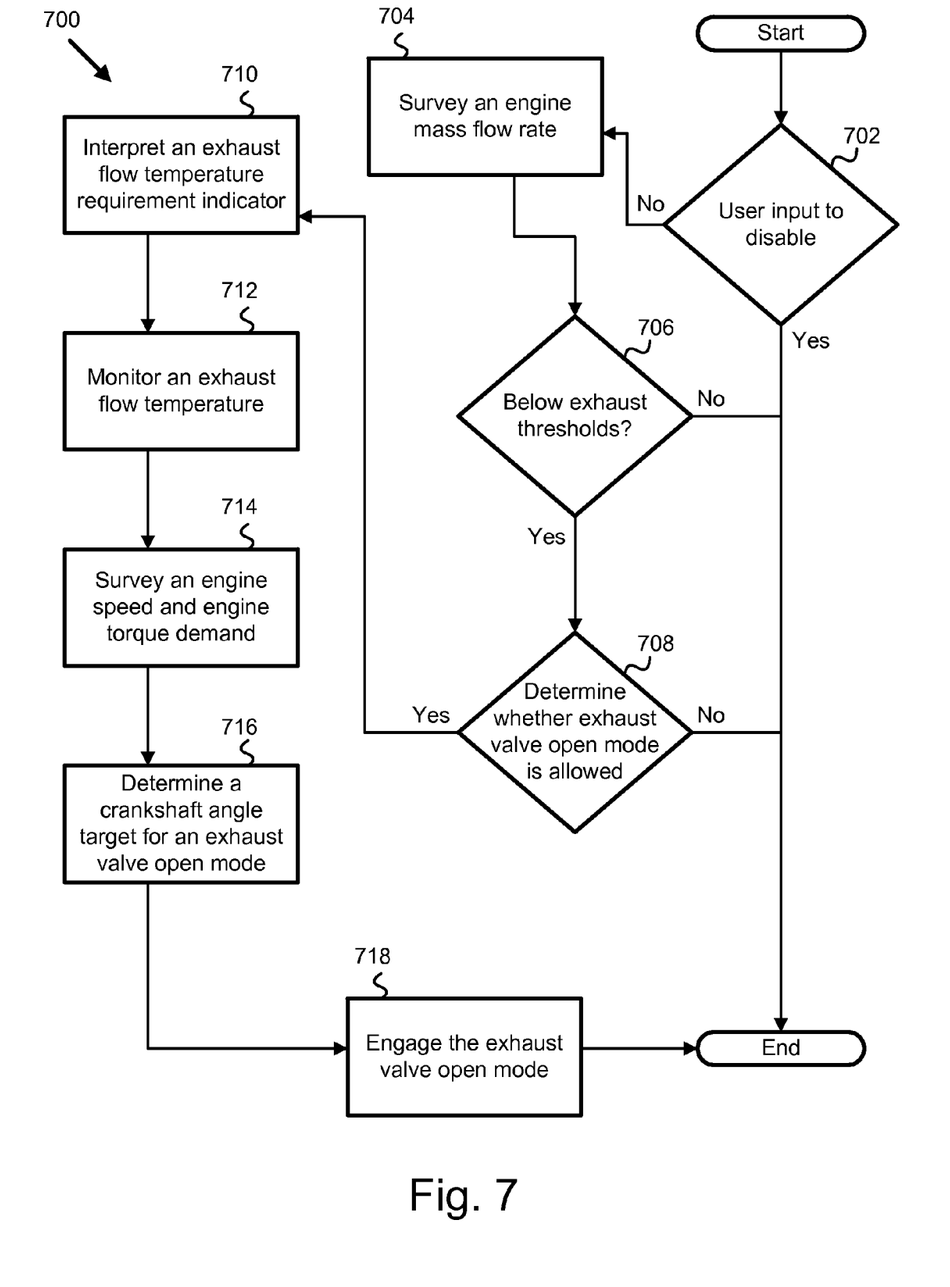
FIG. 7 is a schematic flow diagram depicting one embodiment of a method to efficiently increase exhaust flow temperature for an internal combustion engine.

FIG. 7 is a schematic flow chart diagram depicting one embodiment of a method 700 to efficiently increase exhaust flow temperature for an internal combustion engine 104. The method 700 may comprise a checking 702 whether a user input to disable the exhaust valve opening mode is active. The method 700 further includes the operating conditions module 406 surveying 704 the engine mass flow rate, and determining 706 if the exhaust mass flow rate is below a threshold. The opening target module 410 may determine 708 whether the exhaust valve open mode is otherwise allowed.

The method 700 continues with an operating conditions module interpreting 710 the exhaust flow temperature requirement indicator 404, and monitoring 712 an exhaust flow temperature, engine speed, and engine torque demand. The opening target module may determine 716 a crankshaft angle target 414 for an exhaust valve open mode. The actuation module 412 engages 718 the exhaust valve open mode based on the crankshaft angle target 414.

Figure 8:
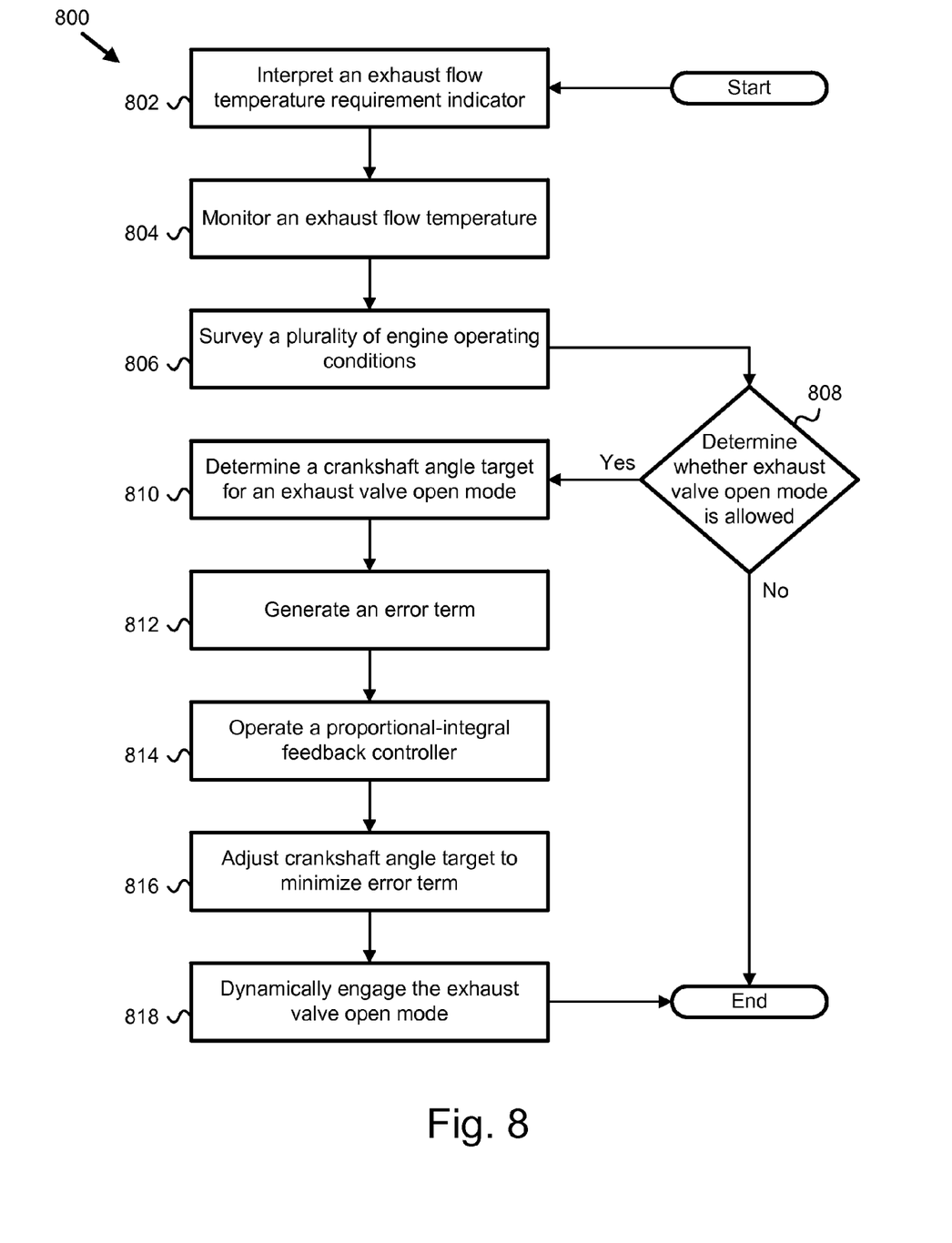
FIG. 8 is a schematic flow chart diagram depicting one embodiment of a method to efficiently increase exhaust flow temperature for an internal combustion engine.

FIG. 8 is a schematic flow chart diagram depicting one embodiment of a method 800 to efficiently increase exhaust flow temperature for an internal combustion engine 104. The method 800 may be implemented as a computer program product. In one embodiment, the method 800 includes the temperature determination module 402 interpreting 802 an exhaust flow temperature requirement indicator 404, which may be a temperature requirement for an aftertreatment device. The operating conditions module 406 monitors 804 an exhaust flow temperature and surveys 806 a plurality of other engine operating conditions, which may be engine speed, engine torque, EGR mass flow rate, and engine exhaust mass flow rate and/or engine inlet mass flow rate. The opening target module 410 determines 808 whether the exhaust valve open mode is allowed, which may be based on the EGR mass flow rate.

The opening target module 410 may determine 810 the crankshaft angle target for an exhaust valve open mode, which may be a value from a transfer function relating the crankshaft angle target to an exhaust flow temperature for a given engine speed and torque demand, where the transfer function may be represented in a table 500. In one embodiment, the opening target module 410 generates 812 an error term based on a difference between a required temperature requested at the exhaust outlet 112 and the actual temperature at the exhaust outlet 112. The method further comprises the opening target module 410 operating 814 a proportional-integral feedback controller and adjusting 816 the crankshaft angle target to minimize the error term. The method 800 further includes the actuation module dynamically engaging 818 the exhaust valve open mode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for efficiently increasing exhaust flow temperature for an internal combustion engine, the method comprising:

interpreting an exhaust flow temperature requirement indicator;

monitoring an exhaust flow temperature;

surveying a plurality of engine operating conditions comprising engine speed, engine torque demand, exhaust gas recycle mass flow rate and one of engine exhaust mass flow rate and engine inlet mass flow rate;

determining a crankshaft angle target for an exhaust valve open mode based on the exhaust flow temperature requirement indicator, the exhaust flow temperature, and the plurality of engine operating conditions; and
engaging the exhaust valve open mode based on the crankshaft angle target.

2. The method of claim 1, wherein interpreting an exhaust flow temperature requirement indicator comprises determining a temperature requirement for an aftertreatment device.

3. The method of claim 1, further comprising determining that the exhaust valve open mode is allowed when the one of engine exhaust mass flow rate and engine inlet mass flow rate is below a threshold.

4. The method of claim 1, further comprising determining that the exhaust valve open mode is allowed when the exhaust gas recycle mass flow rate is below a threshold.

5. The method of claim 1, further comprising interpreting an exhaust valve open mode allowed indicator, and disabling the exhaust valve open mode when the exhaust valve open mode allowed indicator indicates that the exhaust valve open mode is not allowed.

6. The method of claim 1, wherein the crankshaft angle target comprises a value between top-dead-center and 125 degrees after top-dead-center.

7. An apparatus for efficiently increasing exhaust flow temperature for an internal combustion engine, the apparatus comprising:
a temperature determination module configured to interpret an exhaust flow temperature requirement indicator;
an operating conditions module configured to survey a plurality of engine operating conditions by communicating with sensors coupled to an engine, the engine operating conditions comprising engine speed and the engine torque demand;
an opening target module configured to determine a crankshaft angle target for an exhaust valve open mode by sending the engine speed, the engine torque demand, and the exhaust flow temperature requirement indicator to a table representing a transfer function relating the crankshaft angle target to an exhaust flow temperature for a given engine speed and engine torque demand, and returning the crankshaft angle target from the table; and
an actuation module configured to dynamically engage the exhaust valve open mode based on the crankshaft angle target.

8. The apparatus of claim 7, wherein the temperature determination module is further configured to determine a target temperature based on the exhaust flow temperature requirement indicator.

9. The apparatus of claim 7, wherein the opening target module is further configured to determine a crankshaft angle target by determining an error term based on a difference of the exhaust flow temperature and the target temperature, and to adjust the crankshaft angle target to minimize the error term.

10. The apparatus of claim 7, further comprising a diesel oxidation catalyst (DOC), and wherein the exhaust flow temperature requirement indicator comprises a temperature required at an engine exhaust outlet such that a temperature at the DOC is sufficient to oxidize unburned hydrocarbons in the exhaust.

11. The apparatus of claim 7, further comprising a particulate filter, and wherein the exhaust flow temperature requirement indicator comprises an indication that the particulate filter requires a regeneration event.

12. The apparatus of claim 7, further comprising a particulate filter, and wherein the exhaust flow temperature requirement indicator comprises a temperature required at an engine exhaust outlet such that a temperature at the particulate filter is sufficient to oxidize particulates on the particulate filter.

13. The apparatus of claim 7, wherein the opening target module is further configured to interpret a transfer function relating a nominal crankshaft angle target to an exhaust flow final temperature based on a given engine speed and a given engine torque, and to determine the crankshaft angle target based on the nominal crankshaft angle target.

14. The apparatus of claim 13, wherein the operating conditions module is further configured to monitor an ambient temperature, and wherein the transfer function further relates the nominal crankshaft angle target to the ambient air temperature.

15. A computer program product comprising a computer useable medium including a computer readable program, wherein the computer readable program when executed on a computer causes the computer to:
interpret an exhaust flow temperature requirement indicator;
monitor an exhaust flow temperature;
survey an engine speed and an engine torque demand;
determine a crankshaft angle target for an exhaust valve open mode based on the exhaust flow temperature requirement indicator, the engine speed, and the engine torque demand by generating an error term based on the exhaust temperature and the exhaust temperature requirement indicator, and operating a proportional-integral feedback controller to adjust the crankshaft angle target to minimize the error term; and
dynamically engage the exhaust valve open mode based on the crankshaft angle target.

16. The computer program product of claim 15, wherein the computer readable program when executed on a computer further causes the computer to survey an engine mass flow rate comprising one of an engine exhaust mass flow rate and an engine inlet mass flow rate, and to determine that the exhaust valve open mode is allowed when the one of engine exhaust mass flow rate and engine inlet mass flow rate is below a threshold.

17. The computer program product of claim 15, wherein determining a crankshaft angle target comprises sending the engine speed, the engine torque demand, and the exhaust flow temperature requirement indicator to a table representing a transfer function relating the crankshaft angle target to an exhaust flow temperature for a given engine speed and engine torque demand, and returning the crankshaft angle target from the table.

18. The computer program product of claim 15, wherein dynamically engaging the exhaust valve open mode based on the crankshaft angle target comprises selecting a specific crankshaft angle to engage the exhaust valve open mode for each combustion cycle of an engine.

19. A system for efficiently increasing exhaust flow temperature for an internal combustion engine, the system comprising:
an internal combustion engine comprising a crankshaft and at least one exhaust valve, and producing an exhaust flow;

an exhaust valve opening mechanism configured to force the at least one exhaust valve open at a variably commanded crank angle;

an aftertreatment component requiring periodic exhaust flow temperature increases;

a controller comprising:
- a temperature determination module configured to interpret an exhaust flow temperature requirement indicator;
- an operating conditions module configured to survey a plurality of engine operating conditions comprising engine speed, engine torque demand, exhaust gas recycle mass flow rate and one of engine exhaust mass flow rate and engine inlet mass flow rate;
- an opening target module configured to determine a crankshaft angle target for an exhaust valve open mode based on the exhaust flow temperature requirement indicator and the plurality of engine operating conditions; and
- an actuation module configured to dynamically engage the exhaust valve open mode based on the crankshaft angle target.

20. The system of claim 19, wherein the aftertreatment component comprises a member selected from the group consisting of a diesel oxidation catalyst, a nitrogen-oxide adsorption catalyst, and a three-way catalyst.

21. The system of claim 19, wherein the aftertreatment component comprises a member selected from the group consisting of a particulate filter, and a four-way catalyst.

* * * * *